United States Patent
Lasi et al.

[11] Patent Number: 6,095,022
[45] Date of Patent: Aug. 1, 2000

[54] SELF-DAMPING BAR PUSHER ROD FOR BAR FEEDERS

[75] Inventors: Giovanni Lasi, Rimini; Renato Mingozzi, Russi, both of Italy

[73] Assignee: I.E.M.C.A. Industria Elettromeccanica Complessi Automatici S.p.A., Faenza, Italy

[21] Appl. No.: 09/045,816

[22] Filed: Mar. 23, 1998

[30] Foreign Application Priority Data

Apr. 24, 1997 [IT] Italy .................................. BO97A0244

[51] Int. Cl.$^7$ ...................................................... B23B 13/12
[52] U.S. Cl. .................................. 82/127; 82/153; 82/163; 82/903
[58] Field of Search .............................. 82/126, 127, 153, 82/163, 903, 904; 414/14, 17, 18; 188/378, 379, 380, 266, 281, 282.1, 288, 297, 316, 318

[56] References Cited

U.S. PATENT DOCUMENTS 3,464,203  9/1969  Twersky .
4,149,437  4/1979  Winberg et al. ........................... 82/163
4,376,398  3/1983  Love .......................................... 82/127
5,343,788  9/1994  Goforth .
5,520,493  5/1996  Cucchi .................................. 82/127 X
5,562,381  10/1996  Cucchi .................................. 82/127 X

FOREIGN PATENT DOCUMENTS 2819347  11/1979  Germany ................................. 82/163

*Primary Examiner*—Henry W. H. Tsai
*Attorney, Agent, or Firm*—Guido Modiano; Albert Josif; Daniel O'Byrne

[57] ABSTRACT

A bar pusher rod for bar feeders in automatic lathes provided with an abutment for stopping the advancement of the bar to be machined, a damping element being slidingly accommodated inside the bar pusher, the damping element being composed of a mass with which a decelerator is associated, the damping element being suitable to neutralize the kinetic energy of the bar pusher and of the bar to be machined when impact occurs against the lathe abutment, so as to avoid rebounds off the abutment.

6 Claims, 2 Drawing Sheets

SELF-DAMPING BAR PUSHER ROD FOR BAR FEEDERS

BACKGROUND OF THE INVENTION

The present invention relates to a self-damping bar pusher rod for bar feeders and is used in particular in bar feeders for automatic lathes.

It is known that in automatic lathes the bar to be machined is made to advance by means of a bar pusher which consists of a rod provided, at its front end, with a collet for retaining the rear end of the bar to be machined. The machining of the bar entails its advancement through the tubular spindle of the lathe up to an abutment which determines the length of the portion to be machined. After the bar has stopped against the abutment, it is gripped by the collet of the spindle in order to be turned or to undergo other machining operations.

The problem that currently occurs in automatic lathes is that the time available to make the bar advance is increasingly limited, since it is considered to be unproductive. In order to reduce the advancement time, in the absence of suitable devices in the lathe, the bar advancement speed is increased. However, this increase causes the bar to rebound off the abutment of the lathe and, if the opening time of the collet of the lathe is short, when the collet closes again the bar often is not arranged against the reference abutment and accordingly the machined part is shorter and must be rejected.

The solutions used so far to eliminate this drawback consist in providing rebound-preventing devices which act on the motorization system of the bar pusher, but these have proved to be insufficient in addition to being uneconomical in relation to the result achieved.

SUMMARY OF THE INVENTION

The aim of the present invention is to provide a bar pusher rod which allows to obviate the above drawbacks much more effectively and in a technically much simpler manner.

This aim is achieved with a bar pusher rod for bar feeders in automatic lathes provided with an abutment for stopping the advancement of the bar to be machined, characterized in that a damping element is slidingly accommodated inside said bar pusher, said damping element being composed of a mass with which a decelerator is associated, said damping element being suitable to neutralize the kinetic energy of the bar pusher and of the bar to be machined when impact occurs against said lathe abutment, so as to avoid rebounds off said abutment.

BRIEF DESCRIPTION OF THE DRAWINGS

Further characteristics and advantages of the bar pusher according to the present invention will become apparent from the following detailed description of a preferred embodiment thereof, illustrated only by way of non-limitative example in the accompanying drawings, wherein.

DESCRIPTION OF THE PREFERRED EMBODIMENTS

Figure 1:
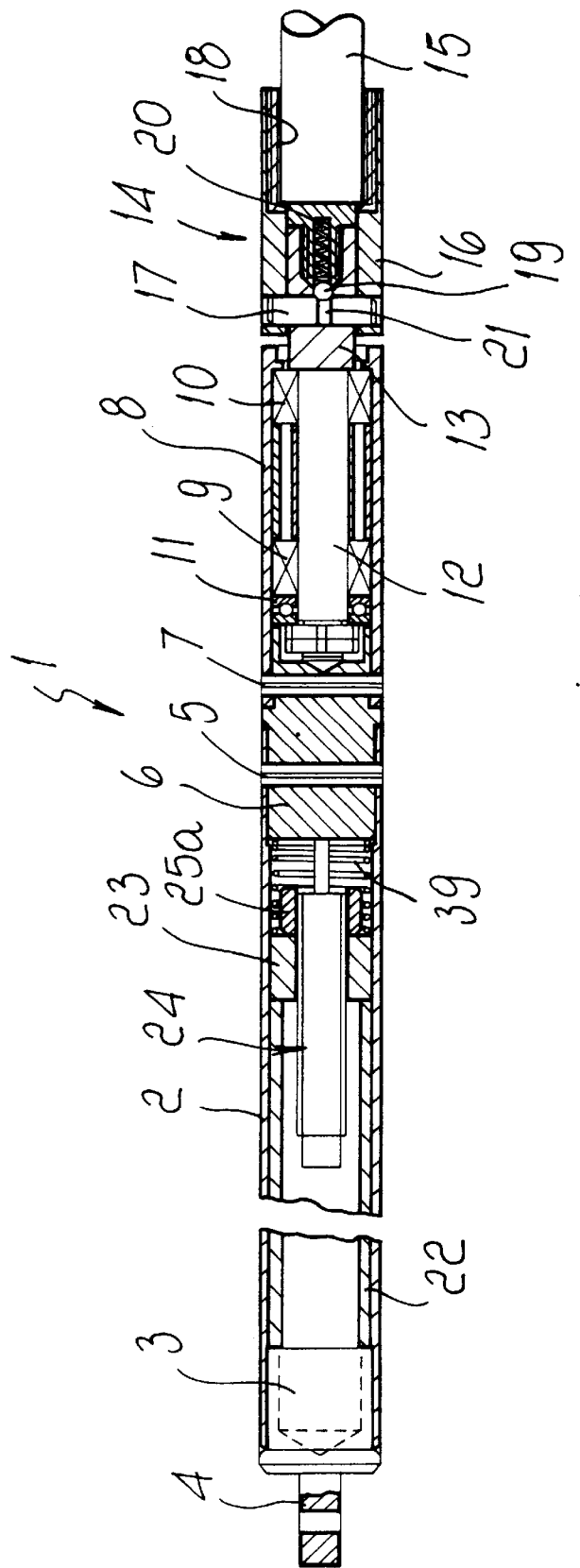
FIG. 1 is a longitudinal sectional view of the bar pusher according to the present invention.

With reference to FIG. 1, the bar pusher is generally designated by the reference numeral 1 and is composed of a tube 2 which is closed, at the rear end relative to the advancement direction of the bar to be fed to the lathe, by a plug 3 rigidly coupled to said tube. The plug 3 has a lug 4 for coupling the bar pusher to an actuation element, for example a chain.

A cylindrical body 6 is inserted and fixed, by means of an elastic pin 5, in the front end of the tube 2; a sleeve 8 is centered and fixed on the cylindrical body 6 by means of a second pin 7 and has the same diameter as the tube 2.

A shaft 12 is rotatably supported in the sleeve 8 by means of radial bearings 9 and 10 and of a thrust bearing 11. An enlarged portion 13 of the shaft 12 protrudes at the front from the sleeve 8, and a collet 14 for the insertion and retention of the bar 15 to be machined is applied to said enlarged portion 13.

The collet 14 is constituted by a bushing 16 which is superimposed on the portion 13 and is rotationally fixed thereon by means of a diametrical pin 17. The bushing 16 has a seat 18 which is open at the front for the insertion and retention of the bar 15.

The pin 17 is retained elastically in its seating hole of the portion 13 by means of a ball 19 which is actuated by a spring 20 so as to engage an annular groove 21 of said pin.

A sleeve 22 is slidingly accommodated inside the tube 2, and a ring 23 is rigidly coupled to the end of said sleeve 22 that is adjacent to the body 6. The ring 23 has an internal thread in which an oleodynamic decelerator, generally designated by the reference numeral 24 and fixed by a ring 25a, is screwed.

Figure 2:
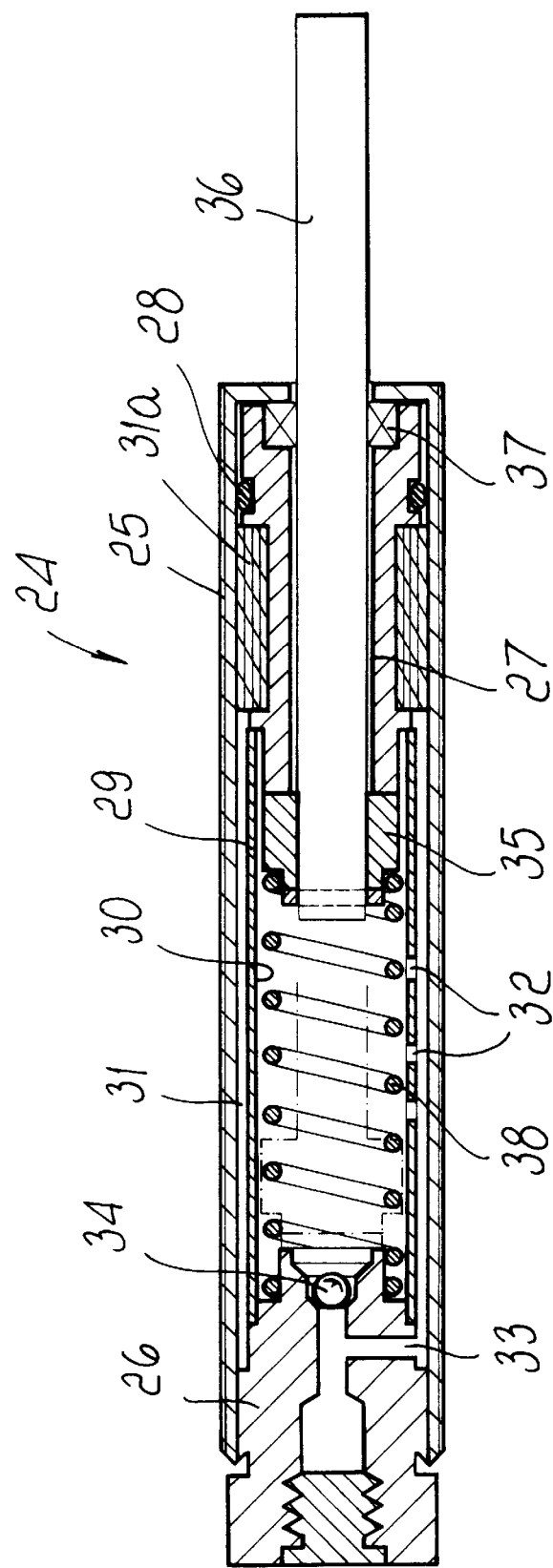
FIG. 2 is a longitudinal sectional view of a damping element which can be applied to the bar pusher of FIG. 1.

As shown more clearly in FIG. 2, the decelerator 24 comprises a cylindrical casing 25 which is threaded externally in order to be screwed in the ring 23. A closure plug 26 and a bushing 27 are inserted in the opposite ends of the casing 25; said bushing 27 forms a seal against the inside wall of the casing 25 by means of an annular gasket 28.

The opposite ends of a cylindrical jacket 29 are coupled in the plug 26 and in the bushing 27; said jacket encloses an inner chamber 30 and forms, together with the casing 25, an outer annular chamber 31.

The chambers 30 and 31 are directly connected to each other by means of a plurality of holes 32 formed along a generatrix of the jacket 29. The outer chamber 31 is also connected to a volumetric compensation chamber 31a and to the inner chamber 30 by means of a duct 33 which is formed in the plug 26 and along which a one-way ball valve 34 is provided which opens into the chamber 30. A piston 35 can slide in the chamber 30 and is keyed on a stem 36 guided through the bushing 27 with a sealing ring 37 interposed.

A spring 38 acts on the piston 35, is accommodated inside the jacket 29, rests against the plug 26 and pushes the stem 36 outwards.

The decelerator 24 is filled with oil which, when the piston 35 is forced against the plug 26 by acting on the stem 36, passes through suitable chokes, producing a slow retraction of the stem into the casing 25.

The sleeve 22 and the decelerator 24 compose a damping element in which the sleeve is the inertial mass that contrasts the rebound when the bar collides against the abutment of the machine tool.

In the inactive condition, i.e., during the machining of a part, the damping element in fact maintains its expanded condition by means of the spring 38, which keeps the damping element 22, 24 in contact with the plug 3 and spaced from the body 6.

When the machined part has been expelled and the bar is again made to advance by a corresponding extent until it collides against the abutment of the machine tool, the moving mass constituted by the sleeve 22 and the decelerator 24 tends, by inertia, to maintain its forward motion, compressing the decelerator and dissipating the kinetic energy it possesses. This dissipation generates a force on the decelerator which contrasts the return of the bar, which thus remains in the position in which it rests against the abutment of the machine tool.

It is evident that the described invention perfectly achieves the intended aim.

The fact that the bar pusher rod according to the present invention can also be applied to conventional lathes and on so-called multispindle lathes is particularly advantageous. Numerous modifications and variations, all of which are within the scope of the same inventive concept, are possible in the practical execution of the present invention. For example, FIG. 1 illustrates an additional spring 39 which is interposed between the ring 23 and the body 6 and is meant to harden the compression of the decelerator if the internal spring 38 is too weak.

What is claimed is:

1. A bar pusher comprising a tube and a damping element which is slidingly accommodated inside said tube, said damping element comprising a mass and a decelerator, said mass and decelerator being mutually operatively connected so that said damping element neutralizes kinetic energy of the bar pusher and of a bar retained by said bar pusher, said tube having a bar supporting collet end, and a ring with an internal thread, said mass of said damping element being constituted by a sleeve which is slidingly accommodated in said tube, said sleeve including an end thereof which is directed towards the bar supporting collet end of the tube, and said decelerator being screwed in said threaded ring and locked by a stop ring thereof.

2. The bar pusher of claim 1, wherein said decelerator comprises:

a cylindrical casing having an inner wall and which is externally threaded so as to be screwed into said ring;

a closure plug;

a bushing;

a cylindrical jacket being coupled at opposite ends thereof in said plug and in said bushing to join a seal against the inner wall of the cylindrical casing, said cylindrical jacket enclosing an internal chamber thereof and forming further, with said cylindrical casing, an outer annular chamber, said internal and outer chambers being directly connected to each other through a plurality of holes formed in said cylindrical jacket;

a volumetric compensation chamber being connected to said outer chamber at one end of said outer chamber;

a duct formed in said closure plug to connect another end of said outer chamber to said inner chamber through a one-way valve provided in said duct which opens onto said inner chamber;

a piston being slideable in said inner chamber;

a stem on which said piston is keyed, said stem being guided through said bushing;

sealing means provided between said stem and said bushing;

a spring acting on said stem, said spring being accommodated in said cylindrical jacket and resting on said closure plug so as to push out said stem, said decelerator being filled with oil for producing a slow retraction of the stem into the cylindrical casing, said spring being adapted to keep said stem actuated outward so as to keep said damping element in a condition in which said stem is extended inside said tube.

3. A bar pusher (1) comprising:

a tube (2) which is closed at a first end of the tube;

a body (6) arranged at a second end of the tube;

a bar retention collet (14) connected to said body such that said collet may rotate about a longitudinal axis of said tube and such that said collet is fixed in axial position with respect to the longitudinal axis of said tube;

a sleeve (22) slidably accommodated inside said tube adjacent said first end of said tube;

a decelerator (24) fixed to said sleeve;

a casing (25) of said decelerator fixed to said sleeve;

a piston (35) of said decelerator slidably arranged inside said casing;

a stem (36) of said decelerator fixed to said piston and extending out of said casing for contact with said body; and a spring element (38) of said decelerator arranged inside said casing for biasing said stem in a direction out of said casing.

4. The bar pusher of claim 3 wherein said casing is sealed and filled with oil.

5. The bar pusher of claim 3 further comprising:

a jacket (29) fixed inside said casing and forming an inner chamber (30) arranged inside said jacket and an outer chamber (31) arranged between said jacket and said casing;

a plurality of holes (33) formed in said jacket and directly communicating between said inner and outer chambers; and a duct (33) extending outside of said jacket between said outer chamber and said inner chamber.

6. The bar pusher of claim 4 further comprising:

a jacket (29) fixed inside said casing and forming an inner chamber (30) arranged inside said jacket and an outer chamber (31) arranged between said jacket and said casing;

a plurality of holes (33) formed in said jacket and directly communicating between said inner and outer chambers; and a duct (33) extending outside of said jacket between said outer chamber and said inner chamber; and wherein said casing is sealed and filled with oil.

* * * * *